US008745163B2

(12) United States Patent
Hines

(10) Patent No.: US 8,745,163 B2
(45) Date of Patent: Jun. 3, 2014

(54) REAL-TIME, CUSTOMIZED EMBEDDING OF SPECIFIC CONTENT INTO LOCAL WEBSERVER PAGES

(75) Inventor: Alan C Hines, Austin, TX (US)

(73) Assignee: Wayport, Inc., Austin, TX (US)

(*) Notice: Subject to any disclaimer, the term of this patent is extended or adjusted under 35 U.S.C. 154(b) by 780 days.

(21) Appl. No.: 11/835,587

(22) Filed: Aug. 8, 2007

(65) Prior Publication Data
US 2008/0040425 A1    Feb. 14, 2008

Related U.S. Application Data

(60) Provisional application No. 60/821,791, filed on Aug. 8, 2006.

(51) Int. Cl.
*G06F 15/16*    (2006.01)

(52) U.S. Cl.
USPC .......................................................... 709/219

(58) Field of Classification Search
USPC .................................. 709/219, 203; 715/234
See application file for complete search history.

(56) References Cited

U.S. PATENT DOCUMENTS

| | | | |
|---|---|---|---|
| 6,016,490 A | 1/2000 | Watanabe et al. | |
| 6,167,438 A | 12/2000 | Yates et al. | |
| 6,212,564 B1 | 4/2001 | Harter et al. | |
| 6,212,565 B1 | 4/2001 | Gupta | |
| 6,442,651 B2 | 8/2002 | Crow et al. | |
| 6,606,525 B1* | 8/2003 | Muthuswamy et al. | 700/52 |
| 6,732,176 B1 | 5/2004 | Stewart et al. | |
| 7,000,008 B2* | 2/2006 | Bautista-Lloyd et al. | 709/219 |
| 7,437,660 B1* | 10/2008 | Mehta et al. | 715/205 |
| 7,552,220 B2 | 6/2009 | Marmigere et al. | |
| 7,912,921 B2 | 3/2011 | O'Rourke et al. | |
| 8,078,673 B2 | 12/2011 | Hines | |
| 2002/0010753 A1 | 1/2002 | Matsuoka et al. | |
| 2002/0013825 A1 | 1/2002 | Freivald et al. | |
| 2003/0014443 A1* | 1/2003 | Bernstein et al. | 707/513 |
| 2003/0023640 A1* | 1/2003 | Challenger et al. | 707/530 |

(Continued)

FOREIGN PATENT DOCUMENTS

| | | |
|---|---|---|
| EP | 2054814 A2 | 5/2009 |
| EP | 2054832 A2 | 5/2009 |
| WO | 2008021863 A2 | 2/2008 |
| WO | 2008021864 A2 | 2/2008 |

OTHER PUBLICATIONS

PCT/US07/75444 PCT International Search Report, Mar. 26, 2008.

*Primary Examiner* — Krista Zele
*Assistant Examiner* — Esther Benoit
(74) *Attorney, Agent, or Firm* — Toler Law Group, PC

(57) ABSTRACT

A web server utility executes on a server and provides the following functions: determining when a web page profile also includes an assignment of additional content; dynamically retrieving the additional content; and generating the web page with the additional content either appended to, prepended to, or wholly replacing one or more sections of the baseline content. When the utility detects assignment of additional content, the utility checks a specific location within the filesystem for the additional content. When the additional content is not found at the specific location, the utility automatically checks the temporary directory (for static content) then the centralized administrative and/or content (CAC) server for the additional content. When the additional content is dynamic, the CAC server retrieves and executes the file at the CAC server to generate the dynamic content, which is transmitted back to the web server for rendering within or as the whole-page output.

37 Claims, 7 Drawing Sheets

(56) References Cited

U.S. PATENT DOCUMENTS

| | | |
|---|---|---|
| 2003/0191858 A1 | 10/2003 | Adusumilli |
| 2005/0108418 A1* | 5/2005 | Bedi et al. .................. 709/232 |
| 2005/0204063 A1 | 9/2005 | O'Brien et al. |
| 2006/0020883 A1* | 1/2006 | Kothari et al. ............... 715/513 |
| 2006/0259371 A1* | 11/2006 | Perrier et al. ................. 705/26 |
| 2007/0078978 A1 | 4/2007 | Arnold et al. |
| 2007/0130151 A1* | 6/2007 | Wiles ............................ 707/10 |
| 2009/0240787 A1 | 9/2009 | Denny |

* cited by examiner

REAL-TIME, CUSTOMIZED EMBEDDING OF SPECIFIC CONTENT INTO LOCAL WEBSERVER PAGES

PRIORITY

Benefit of priority under 35 U.S.C. §119(e) is claimed based on U.S. Provisional Application No. 60/821,791, filed on Aug. 8, 2006, and titled "Automated Acquisition and Maintenance of Files Comprising Web-Servable Content, Via Customized Handler Of "404: Not Found" Error Conditions Encountered by a Webserver." The content of which is incorporated herein by reference.

RELATED APPLICATIONS

The present invention is related to the subject matter of commonly-assigned co-pending patent application, having Ser. No. 11/835,579, and titled "Automated Acquisition and Maintenance of Web-Servable Content Via Enhanced "404: Not Found" Handler." The subject matter of the related application is incorporated herein by reference.

BACKGROUND OF THE INVENTION

1. Field of the Invention

The illustrative embodiment of the present invention relates generally to data communication networks and in particular to web servers within data communications networks. Still more particularly, the present invention relates to providing web-servable content within data communications networks.

2. Description of the Related Art

With the exponential growth in the use of the Internet, an increasing number of businesses now advertise and/or provide business over the Internet. These businesses typically provide web pages with content hosted on servers that are accessible once a connection the Internet is made. Also, as Internet users become more and more mobile (with the proliferation of mobile computers and web access over portable personal devices, such as cell phones, PDAs, and the like), one area of growth has been the demand for remote access to the Internet via access points made available in public and/or private locations.

One area of development has been the implementation of server networks accessible via access points—in the form of either wireless access points implementing the 802.11 Wireless Ethernet protocol ("WiFi"), or hardwired Ethernet connection ports—in public and/or private locations (i.e., away from a home or office base). These access points enable a mobile user with a personal computing device (PCD) to sign in and access information that may be located on a server of the server network or on the Internet. Each such access via the server network is routed through one of the web servers, which is often connected to the Internet. Also, the web servers are frequently connected to a centralized administrative and/or content (CAC) server that operates as a control and/or monitoring point for the server network.

Companies that provide these access points, such as Wayport, Inc., a Texas corporation, have provided thousands of such access points through the United States and Canada. Each of these access points are linked to a specific one (or more) of many hundreds and potentially thousands of content servers (web servers) interconnected in a server network. The web servers are typically loaded with web-servable content by service provider technical personnel or business partners or customers who desire specific content on specific ones of the web servers. This content is stored in a storage facility, such as a filesystem, associated with the particular web server. When a user initiates a sign on procedure at the web server, the user is provided with an initial set of one or more login pages (e.g., "Welcome" or information pages).

As more people utilize local access points to access the greater Internet, the ability of the access point provider (or owner or developer) to target potential customers/clients with information at specific access points has become a valuable business development/expansion tool.

Businesses utilizing these access points to provide their customers with access to the greater Internet typically desire the ability to customize the access pages through which a user of a publicly accessible Internet Access Service must navigate before being allowed access to the greater Internet. The user's status is that of a "captive audience," until the user has completed the connection process. The presence of this captive audience makes the available "space" on these access pages a comparatively valuable piece of "screen estate." And, many content providers have an interest in "sub-letting" this screen estate in order to place thereon the content provider's own advertisement or other informational content.

Thus, many businesses turn to the providers of these access points, seeking to exploit the use of these network access points by providing advertising content of the business for display on the login/sign-in pages of the access points (Welcome pages). This business model of displaying business specific information on the Welcome pages provided at the access points enables the business(es) to capitalize on the captive audience of users who connect to (or attempt to access) the access points, perhaps to gain access to the Internet.

Additionally, the owners and/or operators of venues where these public access points are traditionally installed have increasingly endeavored to exert control over the content presented on these web pages. Among the desired control is control of the overall look, feel, and/or branding of the access page. Also, these owners and operators desire the level of control to provide granular customization along the lines of providing (a) specific messages to (b) specific users in, for example, (c) a specific meeting room, for (d) a specific block of time.

A major impediment to providing such a customized service offering has always been the difficulty involved with installing the various files that a web page sources from its hosting server, on individual, localized web servers, given the several thousand servers in a large sever network. This network may be controlled by a single equipment service provider/manufacturer, such as Wayport, which provides administrative, content, and technical support. Conventional methods of distributing such content files involve the secure copying of, followed by remote installation of a number of software packages to each server in the equipment service provider's server network. This individualized installation proves a daunting prospect, particularly when any particular content item may only have been intended for display on perhaps a dozen of these several thousand servers and only for a limited time before the content desired to be provided at that location changes.

With all web-servable content stored in packages that must undergo rigorous testing by both (a) the manufacturer/distributor and (b) the many service partners and clients of the manufacturer/distributor, before the packages may be generally released, the amount of managerial overhead required for any such deployment ultimately made such "one-off" customizations a practical impossibility with conventional methods.

SUMMARY OF THE CLAIMED EMBODIMENTS

Disclosed is a method, system and computer program product by which a web server dynamically provides an extensively customizable web interface on an access web page. The web server includes a processing device and a utility executing on the processing device, which provides the following functions: determining when a web page that has been programmed to display a standard baseline content has been assigned, within a web page content profile, one or more additional content; dynamically retrieving the one or more additional content; and generating the web page with the one or more additional content provided in place of, or integrated within, one or more sections of the baseline content.

The additional content is one of static content and dynamic content. When the utility detects an assignment of the additional content within the web page profile, the utility checks a specific location within the filesystem for the additional content. When the additional content is not found at the specific location, and the additional content is static content, the utility automatically checks the temporary directory then checks the centralized administrative and/or content (CAC) server for the additional static content. When the CAC server has a current copy of the content, the CAC server transmits the copy to the web server (assuming the CAC server copy is more recent than any existing copies at the web server). Once the CAC server returns valid static content in response to the requesting web server, the utility generates the web page with the static content inserted in place of sections of the standard baseline content. Un-supported content provided from the CAC server is discarded or ignored when generating the web page.

When the additional content is dynamic content and is not found within the filesystem, the utility automatically requests the additional content from the CAC server. The CAC server retrieves and executes a dynamic file to generate usable dynamic content for insertion within the pre-identified sections of the standard baseline content. When the dynamic content has been generated, the CAC server forwards the content to the web server. If the dynamic content is an embedded content, the content is inserted in or augmented to relevant portions/sections of the standard baseline content, either appending to, prepending to, or wholly replacing particular baseline items. If the dynamic content is one of a pre-processing override content and a post-processing override content, the content is utilized in place of (i.e., as a replacement to) the entire baseline content.

All objects, features, and advantages of the present invention will become apparent in the following detailed written description.

BRIEF DESCRIPTION OF THE DRAWINGS

Illustrative embodiment of the invention are described in the following description with reference to the drawings, in which like numbers represent the same or similar elements, as follows.

This invention is described in a preferred embodiment in the following description with reference to the figures, in which like numbers represent the same or similar elements.

DETAILED DESCRIPTION OF ILLUSTRATIVE EMBODIMENTS

Figure 1:
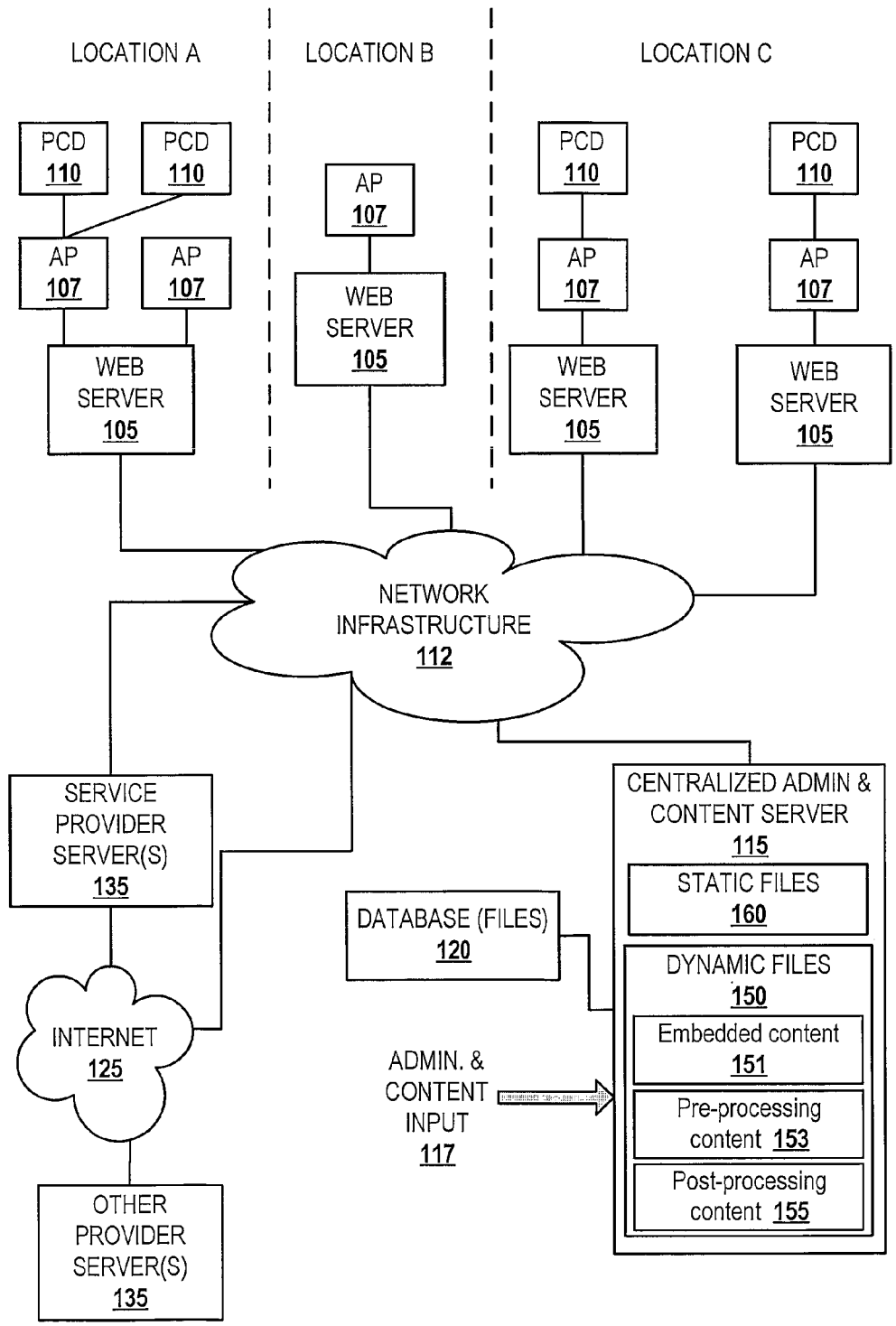
FIG. 1 is an example distributed server network with local access points, web servers, and a centralized administrative and/or content (CAC) server, according to one embodiment of the invention.
Figure 2:
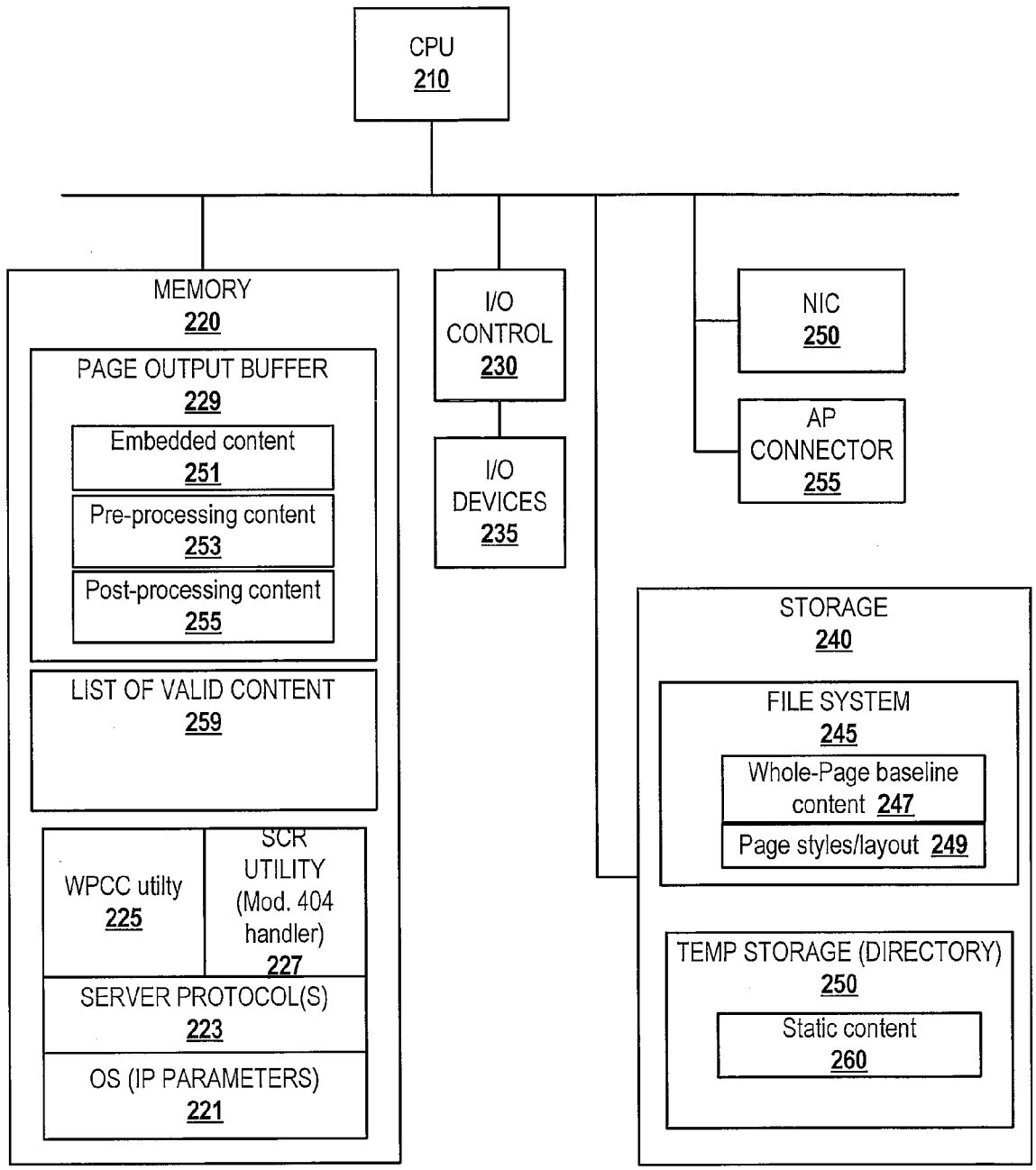
FIG. 2 is an example CAC server having utilities capable of executing thereon for (a) providing customized content in real time to one or more web servers across a distributed server network, such as the server network of FIG. 1, in accordance with embodiments of the invention.

Generally, the illustrative and described embodiments provide a method, system and computer program product for implementing Fully Customizable Welcome Pages (FCWP) for web servers in a distributed server network, such as is illustrated in FIG. 1. The specific functional features are provided by one or more utilities that are executed by the example web server, such as is illustrated by FIG. 2.

In the following detailed description of exemplary embodiments of the invention, specific exemplary embodiments in which the invention may be practiced are described in sufficient detail to enable those skilled in the art to practice the invention. It should be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

With reference now to the figures, FIG. 1 illustrates one embodiment of a distributed server network 100. Network 100 comprises a network backbone (or infrastructure) 112 to which is coupled centralized administrative and content (CAC) server 115, referred to hereinafter as CAC server 115, and a plurality of distributed web servers 105.

Network 100 represents a distributed server system. The network infrastructure 112 may comprise a wired network, a wireless network or a combination of wired and wireless networks. For example, the network infrastructure 112 may be a standard "wired" Ethernet network which connects each of the webservers 105 and by extension each of the wireless (and wired) access points 107 together. Network infrastructure 112 may also be a wireless network based on IEEE 802.11 or other wireless protocol. Network infrastructure 112 is illustrated connected to Internet 125. It is appreciated that network infrastructure 112 may form part of the Internet 125, or may couple to other networks, e.g., other local or wide area networks, such as the Internet 125.

The network communication system 100 may be geographic-based. In other words, the network communication system 100 may provide information and/or services to the user based at least partly on the known geographic location of the user, e.g., as indicated by the access points 107 or as indicated by geographic information (e.g., GPS information) provided from the PCD 110. Notably, while the access points 107 may be specifically located in particular businesses and specific locations, the web servers 105 are not necessarily local to that business and/or locations and may be remote from the location of the access point.

As provided below, CAC server 115 is "centralized" in that CAC server 115 is a single primary source of content data (e.g., files, graphics, web pages, and the like) that may be pushed to or pulled or accessed by any one of web servers 105 across network system 100. Administrative input and content 117 is provided at CAC server 115 and a record of which content are assigned to which sections, on which pages, via the welcome page profile may be stored on CAC server database 120.

CAC server 115 receives administrative and content input 117 and stores the various input within local or associated storage (CAC server database 120) of CAC server. As illustrated by the figure, CAC server 115 host two file types, namely dynamic files 150 and static files 160. More specific to the invention, and as described in greater detail below, three types of dynamic files 150 are provided, embedded content 151, pre-processing content 153 and post-processing content 155, all separately utilized to provide dynamic content for a welcome page. Static files 160 may also be welcome page content, as described herein, and certain static content (260) may be embedded content, which is stored at the webserver 105 (205), as described below with reference to FIG. 2.

As utilized herein, "embedded" content refers to content that is provided inline within the standard output of the baseline page, while "override" content refers to content, which completely replaces the standard output of the baseline page. As will also be described in greater detail below, embodiments of the present invention enables a single location input of content that may then be distributed in real time to specific webservers 105 within network system 100 when the content is required at that specific webserver 105.

Specific content may be provided within specific ones of the web server's file system in a somewhat customizable nature, such that specific servable content at a first web server is different from servable content at a second web server. The below described embodiments provide methods by which customizable web servers are efficiently generated using CAC server with program functionality for customization on a granular level. As will be described in greater detail below, embodiments of the present invention enables a single point of input for content that may then be distributed in real time to specific webservers 105 within network system 100 when the content is required at that specific webserver 105.

Webservers 105 represent a distributed server system by which content is accessible within specific location via one or more access points 107. These locations may be geographic locations or business locations, for example, that may provide or require different content at the respective webservers 105. Three different locations are identified, for example, differentiated as locations A through C, each of which has one or more web servers and one or more access points associated therewith.

Network system 100 includes one or more access points 107, and preferably a plurality of access points 107. At least a subset of the access points 107 may be wireless access points (APs) 107 which communicate with a portable computing device (PCD) 110 in a wireless fashion. Each wireless access point (AP) 107 may have a wireless connector or transceiver (e.g., an antenna) and may operate according to various wireless standards, such as wireless Ethernet (IEEE 802.11). One or more of the access points 107 may also be wired access points which communicate with a portable computing device 110 in a wired fashion. The access points (APs) 107 may be widely distributed in various facilities, such as airports, mass-transit stations, shopping malls, restaurants and other businesses, such as business offices, law firm offices, retail stores, hotels, and the like.

Notably, while the access points may be specifically located in particular businesses and specific locations, the webservers 105 are not necessarily local to that business and/or locations and may be remote from that location of the access point. Each access point 120 may comprise information used to identify or select a network provider for a particular user, as well as related access information to enable the network provider to provide access. When in sufficiently close range to an access point 120, or when the PCD 110 is directly coupled to an access point 120 in a wired fashion, the PCD 110 may access the network utilizing a particular network provider, as discussed further below.

The portable computing device 110 may be any one of various types of devices, including a computer system, such as a portable computer, a personal digital assistant (PDA), an Internet appliance, a communications device, or other wired or wireless device. The PCD may include one or more wireless or wired communication devices utilized for communicating with a wired access point 107. Examples of these devices include a wireless Ethernet card, paging logic, RF communication logic, a wired Ethernet card, a modem, a DSL device, an ISDN device, an ATM device, a parallel or serial port bus interface, or other type of communication device.

According to the described embodiments of the invention, a user operating a portable computing device (PCD) 110 may communicate with one of the access points 110 to gain access to network services, such as Internet access, or to web servable content hosted at the web server 105.

One or more network providers or general content providers may each have an associated network server 136 coupled directly to the network infrastructure 112 and/or a network server 125 coupled via the Internet 125. These example servers 135, 136 host general content of that service provider, which content is also available to PCDs 110 connected to the servers 105 via an AP 107. As used herein, the term "service provider" (or "network provider") is intended to include various types of service and information providers which may be connected (directly or indirectly) to the network infrastructure 112. Each service provider may include one or more servers 135, 136 configured/programmed to provide various goods, information, and/or services as appropriate for the service provider.

A user operating a portable computing device 110 will typically connect to network system 100 via subscription to one (or more) network providers. Examples of network providers include Wayport, iBahn and AT&T, among others.

When the PCD 110 of a user communicates with an AP 107, the respective network provider to which the user is subscribed is determined and the appropriate web server 105 is connected to provide content to that PCD 110.

FIG. 2 illustrates an example data processing system that may operate as one of web servers 105. For simplicity, the system is described generally as server 205, and the specific application of functions within server 205 are determined by the software program (code) executing on processor(s) of server 205. As shown, server 205 comprises a central processing unit 210 coupled via system bus (interconnect) 215 to memory 220 and input/output (I/O) controller 230. I/O controller 230 operates as a control point for various input and output devices, generally represented as I/O devices 235. These I/O devices enable an administrator of web server 205 to (locally) load and/or change servable content, stored in persistent storage (240) of server 205.

Also coupled to system bus 215 are network interface controller (NIC) 250 and access point controller (APC) 255. NIC 250 enables server 205 to connect to other devices (e.g., CAC server 115 of FIG. 1) via a network (e.g., network 112 or Internet 125). Depending on implementation, NIC 250 may be a wireless device or wired connection device. APC 255 provides the point of connectivity between server 205 and one or more access points (such as APs 107 of FIG. 1), via one of a wireless or wired connection.

Server 205 also comprises other storage 240, which is illustrated coupled to system bus 215. According to the described embodiments, storage 240 includes thereon a file system (FS) 245, which hosts a plurality of files, including Whole-page baseline content 247 (or standard welcome page content) and page layout/styles 249, that are utilized by web server 205 to generate the standard welcome page to a PCD (110) connected to server 205 via access point (107). Storage 240 and, by illustration, file system 245, may be located remotely from server 205 perhaps accessible via a network), in other embodiments; However, the described embodiments provides for a local file system 245 to simplify the description of the relevant functional features associated with the embodiments. According to the described embodiments, page layout/styles 249 includes therein certain hooks that enable retrieval of content from another source other than the standard whole-page baseline content 247. Notably, in one alternate embodiment, copies of the dynamic content (150) may be housed within storage 240 along with static content and temporary content. This embodiment assumes that the central administrator or local web server administrator has loaded the dynamic content on the particular web server, allowing the welcome page application to locally retrieve dynamic content for execution on the local web server. Also, with this embodiment, the web server (utility) only accesses the CAC server for dynamic content when the dynamic content cannot be located within the web server's own filesystem.

As further illustrated, storage 240 also includes temporary storage 250, which is a pseudo hardware construct. Temporary storage 250 includes a directory and static web servable content. Specifically, as illustrated, temporary storage 250 provides static content 260, which is static content that may be included within the displayed welcome page, when the page is generated.

Notably, in one embodiment, certain embedded content may be static content 260. As utilized herein, "static content" refers to only those content elements—HTML files, binary graphics, textual CSS documents, etc—that contain no programmatic logic, and are allowed to be stored on the local webserver's filesystem via modified 404 Handler's caching mechanism. Further, "embedded content" refers to content that is included/added within the standard content of the baseline page. "Embedded" content may be static in nature—as in the case of an HTML file. Embedded content may result in the presentation and/or caching of other static content by referencing graphics, for example, within the output. As primarily utilized herein, "embedded" content is described as dynamic in nature, in that the described embedded content uses programmatic logic to determine what, if anything, to return as includable content to the baseline page.

Included within memory 220, is a page output buffer 229, in which static and dynamic content that is to be provided within the generated welcome page is placed before processing by CPU 210. As illustrated, page output buffer includes embedded content 251, pre-processing content 253 and post-processing content 255, as example content that may be provided. As will become clear with the description of FIG. 3 below, these three content files may provided actual usable content, in which case the specific content provided is utilized in generating the Welcome page. Other implementations may allow for use of one or more of the above content. Preferably use of pre-processing content is exclusive of the use of post-processing content.

In one embodiment, the various content elements are retrieved/downloaded from CAC server 115 (FIG. 1) during a first access to the web server by a PCD at an access point. In another embodiment, the contents are pushed to or pulled by the web server, triggered by administrative personnel at the CAC server.

The specific content that is to be utilized to generate the Welcome page is retrieved and stored within list of valid content 259 during processing of the initial PCD connection to the access point. During operation, content from appropriate welcome page files and embedded content is automatically provided within page layout/styles 249 to provide a Welcome Page when access to the web server 205 is initiated from one of access points 107, and the welcome page is displayed on the PCD initiating the connection at the access point 107.

According to the described embodiments, static content loaded onto server 205 from CAC server 115 is stored in temporary storage 229, which enables the Welcome page's static content to be dynamically updated via a pull by the web server 205 or a push by the CAC server 115 to specific web servers serving pre-identified access points, using an identification (ID) associated with the access points and/or web server. Dynamic content is provided to server 205 from CAC server 115 only when specified (e.g., during pre-programmed dates/times or for use with specific access points from which the user connects), and is placed within the page output buffer 229 for generation of a customized welcome page, in lieu of the standard/default welcome page. The particular content is tagged with the ID (access point and/or web server) and downloaded to the specified location for use only at that location. These features are described further below.

In addition to the above described hardware components of server 215, several of the functional features of the invention are provided via software components (i.e., functional program code or utility) executing on CPU 210 of server 205. Thus, as illustrated, located within memory 220 are a number of other software components or utilities, including: (a) operating system 221, which provides the Internet Protocol (IP) parameters for network connection and communication; (b) web server protocols 223, which enables data processing system to operate as a web server and communicate with CAC server over network 100 (FIG. 1); (c) Welcome Page Content Customizing (WPCC) utility, also referred to herein as Fully Customizable Welcome Page (FCWP) utility 225, and which enables features descried herein; and (d) server content retrieval (SCR) utility 227, which enables automatic content updates following receipt of a request for the servable content by implementing a Modified "404: Not Found" error response Handler to retrieve a requested file (or content) from CAC server rather than providing a "404: Not Found" or similar response. The latter utility and associated functional features are described in greater detail in the related application.

WPCC utility 225 is a modified version of the standard welcome page application, which enables redirection through the use of hooks, etc., within the application processing to enable retrieval of customized content for display as a total replacement for the standard welcome page (e.g., pre-processing or post-processing content), or as an integrated but additional part of the standard welcome page (e.g., embedded content).

As introduced above, OS 221 provides the various operational parameters to enable general operation of server 205 as well as the IP (and HTTP) functionality required for network access and transfer of information over the various supported networks. OS 221 in conjunction with web server protocols 223 and WPCC utility 225 enable the various processes by which (a) connection is established by a PCD (110) to server 205 via an AP (107) and (b) authentication, login, and other functional features of the web server's welcome page generation processes and other general web server processing are enabled/provided.

In implementation, many of the novel processes supported by the above four software components are provided as a seamless operation via a single execution of code. Also, some overlap may exist in the functionality of WPCC utility 225 and SCR utility 227. For simplicity in describing the invention and as an alternate embodiment, the collective body of code that performs the various functions described herein and/or the described features of the illustrative embodiments is referred to hereinafter as WPCC utility. References to WPCC utility (or execution thereof) thus cover the entire range of functions provided by the illustrative embodiments, which occur at the web server 205. As described herein, WPCC utility is downloaded to all web servers as an upgrade to server functionality, and WPCC utility enables standard welcome page processing to be modified such that a redirection process occurs to select the appropriate welcome page content.

The WPCC utility 260 executes on CPU 210 and provides a series of functional processes, which are illustrated and described below within the description of the flowcharts. Generally, WPCC utility provides the method functions of: (1) force redirection of the welcome page generation process (via hooks within the welcome page layout code, for example) to check for other content to include in the welcome page; (2) retrieving one or more of embedded content and/or pre-processing or post-processing content for use within (or as) the welcome page; and (3) automatically requesting updates or retrieval of content from the CAC server, which provides a pre-determined specific content and layout for that particular web server, which may be unique to that server relative to other servers in the server network. Other functions are also supported as described within the flow chart.

Generally, the illustrative embodiments provide a method, system and computer program product by which a web server dynamically provides an extensively customizable web interface on an access page. Specific content is distributed from the CAC server to only a desired web server. In one embodiment, content distribution occurs in response to a trigger from the web server. A utility is provided at each web server (via global downloaded from the content server), which utility executes to enable a pull from the web server of specific content that is identifiable via a location-identifier (LID) tagged to the content. The utility thus provides the ability to customize web page content on remote servers without having to individually and manually update each server in the large server network. Further, the utility enables this customization to be completed at the time the content is formally incorporated into the server equipment manufacturer's core software libraries.

According to the one embodiment, the CAC server (115) is modified to provide CAC-server level support for WPCC utility functions (or requests) of the web servers. Thus, in one embodiment, CAC server 115 includes FCWP master utility, which executes on the CAC server's processor to provide certain functions and responses to certain requests received from connected web servers 105/205. Among these functions are: (1) granularly assigning welcome page content and page layout/styles (e.g., embedded content, pre-processing content and post-processing content) for each set of web servers requiring different welcome pages; (2) tagging the various welcome page content with a unique identifier associating the content to its respective set of web servers (or access points); (3) enabling a push of welcome page content to each set of web servers identified to receive a specific content at a specific time (where the received content is automatically stored within the temporary directory of the respective web servers); and (4) automatically forwarding assigned/updated versions of welcome page content to specific requesting web servers in response to a pre-defined request from the web server.

In one embodiment, the FCWP master utility may also directly service a welcome page to the PCD initiating access to the web server, when the web server does not have a copy of the welcome page in either the file system or temporary storage. In one implementation of this embodiment, an automatic download of the welcome page to the web server is initiated while the CAC server continues to service the PCD connection until download is completed. CAC server may also provide additional functionality, as described herein and/or within the related patent application.

Figure 4:
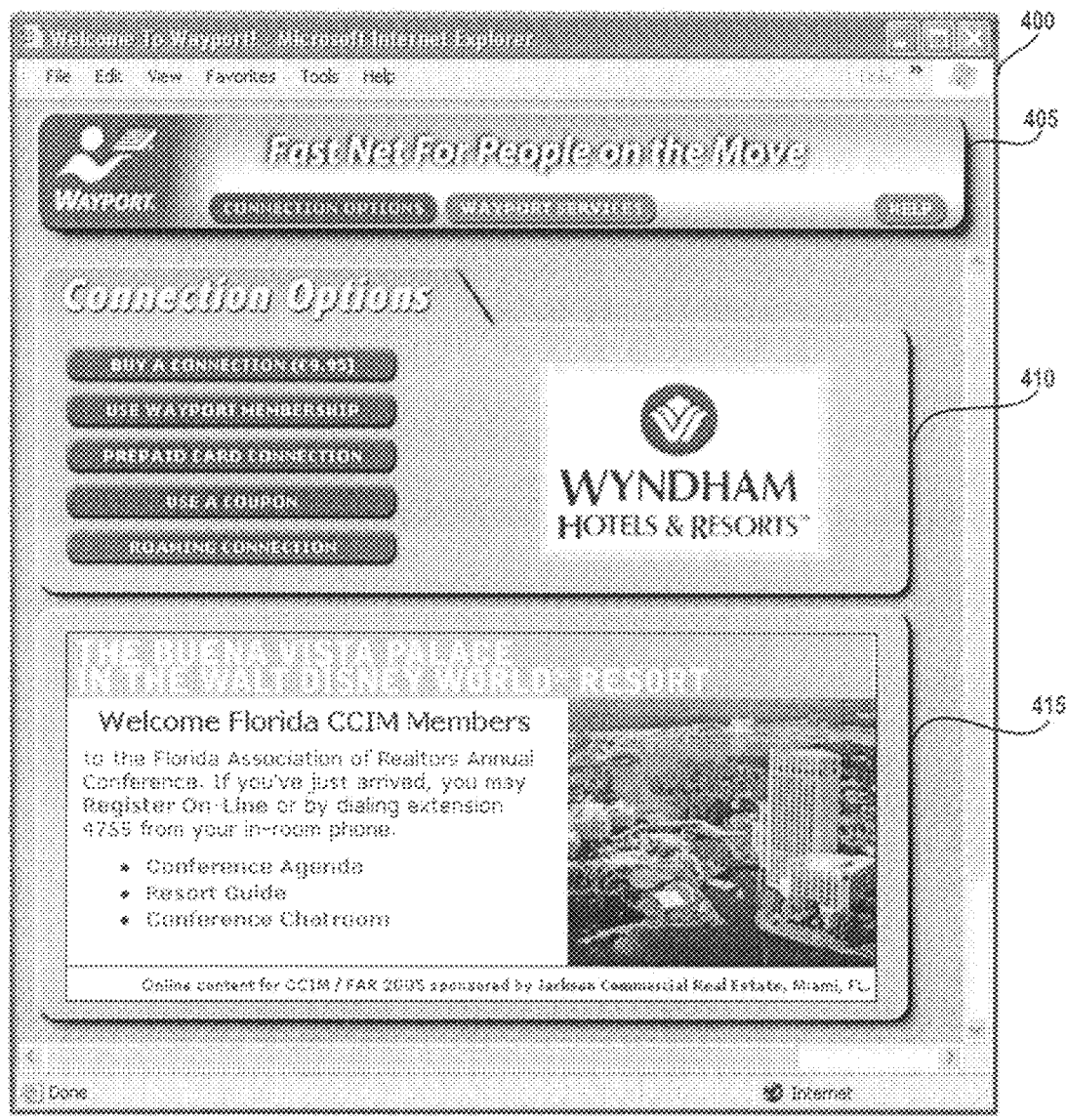
FIG. 4 is an example customized welcome page displaying customizable content of a specific event provided via a webserver's access point, according to one embodiment of the invention.
Figure 5:
FIG. 5 is an example customized welcome page displaying customizable content granularly assigned to different screen areas displayed at a webserver's access point, according to one embodiment of the invention.
Figure 6:
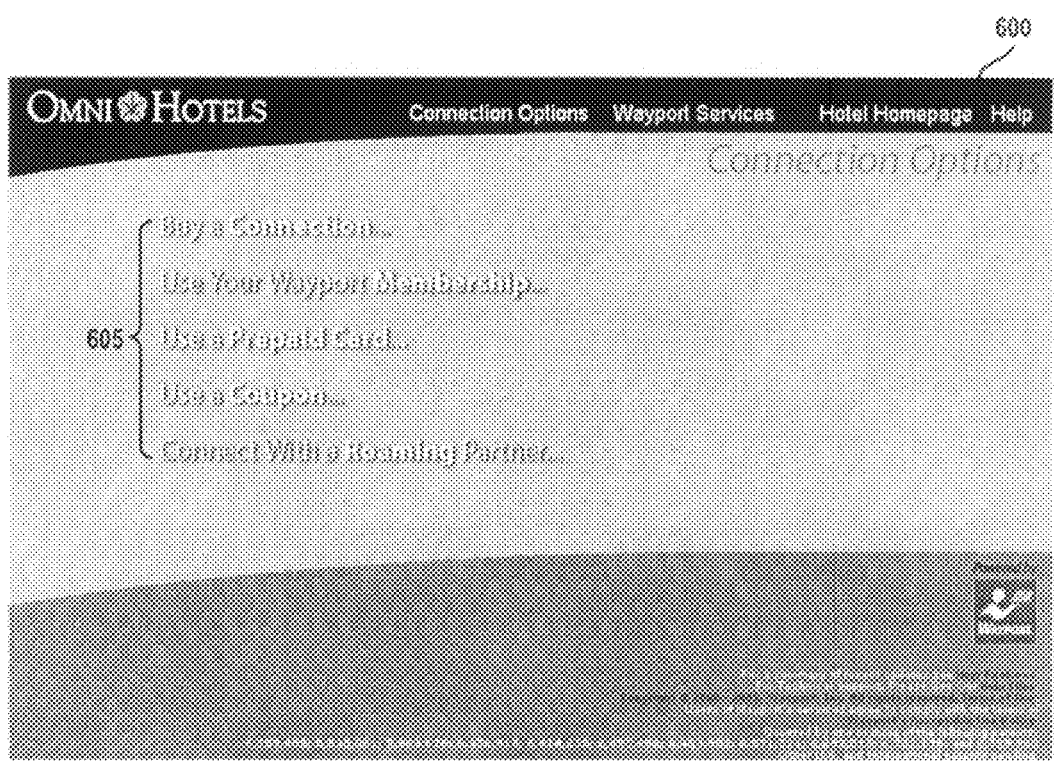
FIG. 6 is an example of a welcome page, which completely replaces the standard welcome page, according to one embodiment of the invention.

FIGS. 4-6, described below, illustrate example web pages that are generated utilizing the features of the WPCC utility as described herein. The graphical user interfaces with customizable content provided via the features of the invention are referred to hereinafter as Fully Customizable (FC) welcome pages. Specifications of the FC welcome pages are provided below.

The FC welcome pages are capable of rendering arbitrary content on any page throughout the application—up to and including total override of design and program function—without requiring package distribution to field web servers, or any machine other than one central "home" server, i.e., CAC server 115 (FIG. 1).

In one embodiment, implementation of the invention utilizes only the legacy Page-Ad-Map architecture, established at the time of the initial conversion of the Welcome Page application from PERL-based CGIs to TCL-based dynamic web pages. No modifications to any database object, central server process or web server-based functionality—other than the Welcome Page application itself—is required before these capabilities may be utilized.

The process for developing these FC welcome pages involve the following: (a) re-architecture of underlying code to unify all layout routines and separate content from presentation (page layout/styles); and (b) extension of legacy content management capabilities to remove restrictions and allow automated distribution of related files. In completing the re-architecture, all layout routines are conformed to one application programming interface (API), e.g., "button" is a "button," regardless of how or when or where or why rendered. Also, static files are separated from dynamic and/or compiled and/or interpreted content to minimize the risk inherent to field upgrades (upgrades occurring at the devices themselves), and allow automated distribution. Finally, Cascading Style Sheets are applied to all output, allowing the same underlying HTML to be presented in any number of different styles (e.g., in either a Wayport or a McDonald's "look," "feel," branding and theme).

In completing the extension of the legacy content management capabilities, the following considerations are made:

(1) Content may be tied, via database records for each welcome page profile, to both universal "hooks" embedded into every page automatically and keyed on unique page identifiers, as well as manually established "hooks" specified by the programmer in any given web page that is dynamically generated by a web server. This process is illustrated by the flowchart of FIG. 3, described below; and (2) Every page has a "PRE-Processing Override" and a "POST-Processing Override" hook available for assignment of content that will terminate processing immediately after rendering, allowing any page to be fully replaced at any time (also illustrated by FIG. 3); and (3) A modified/enhanced "404: Not Found" handler is established inside the AolServer that, upon invocation, will automatically check the local filesystem, temporary directories and/or remote web servers (i.e., CAC server) for any missing content or file, saving local copies of the content/file when found, and where applicable. This final process is described in the related application, which has been incorporated herein by reference.

Notably, while the customization capability described herein focuses that description on providing customizable welcome pages, this customization capability is not limited to only the welcome pages and may be applied to any page, hosted by the service provider (or web server), with which a user (or PCD) interacts, prior to completing a connection process, and being given access on to the open Internet.

Thus, the functionality described herein is applicable to other pages other than the first page that the user sees or interacts with as a result of the initial redirection process. Specifically, any page that the user encounters can be structured to enable custom content presented inline with, or a replacement page presented in place of, the standard page. For example, the features may be applied to pages such as the "input your credit card" page, the "input your username and password" page, the "help" page, the "thank you—you are now connected" page, and others.

FIG. 6, described below, provides an example of the application of the customization functionality described herein to provide a re-branding of a page. In that illustration, the first page that the user encounters has been "re-branded" via the customization functionality described herein. This re-branding can be applied to every page the user encounters/sees, throughout the user's connection process. For consistency in describing the various embodiments, the embodiments are described with specific reference to the welcome page. It is however understood that the described functionality applies to any one of the various pages that may be encountered by the user, and the specific reference to the welcome page is solely for illustration and not intended to imply any limitation with respect to the applicability of the invention.

Figure 3A:
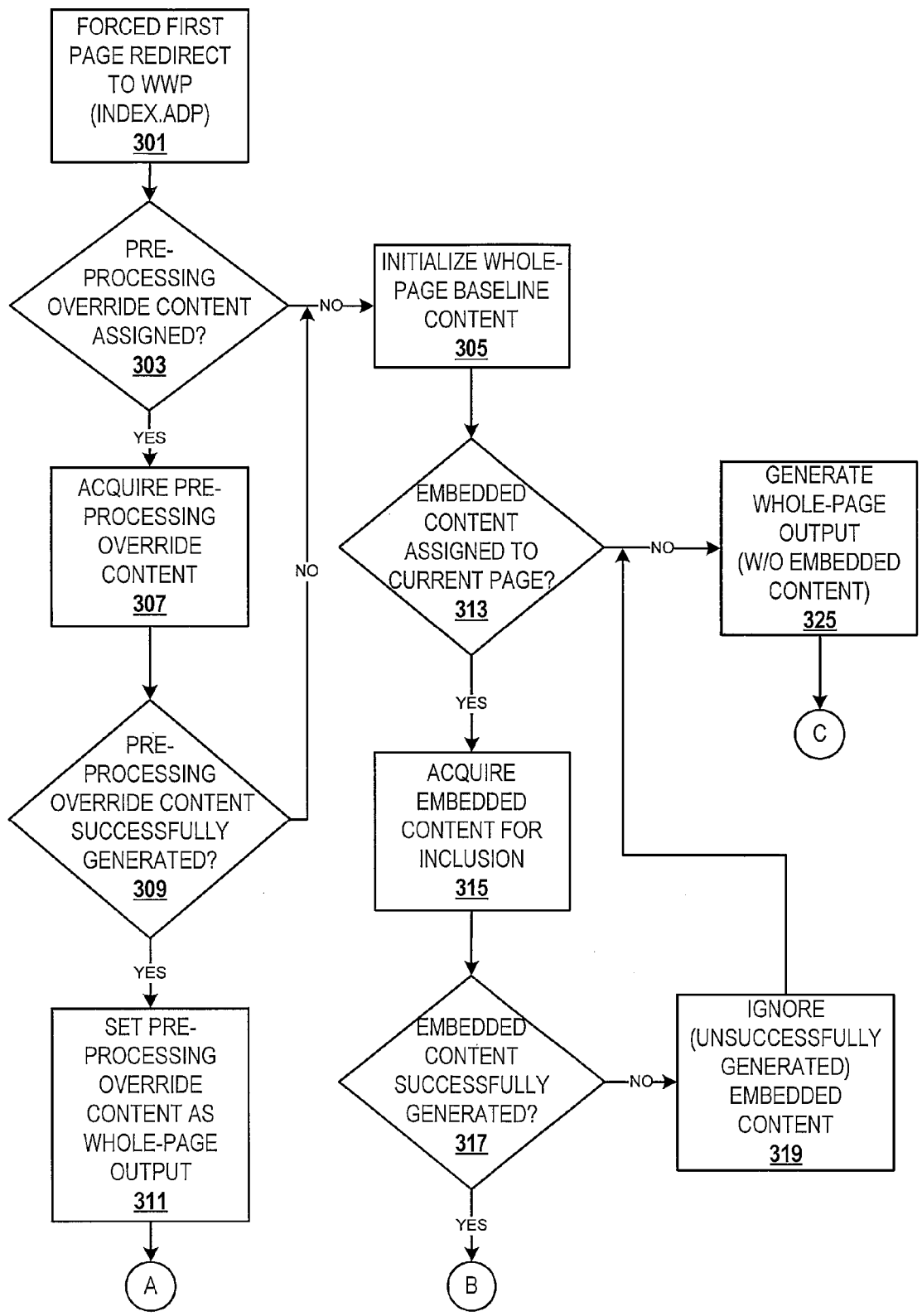
FIGS. 3 (A and B) is a flow chart illustrating the method by which the welcome page content customizing utility executes to provide customized embedded content to a specific page at a webserver's access point, according to one embodiment of the invention.
Figure 3B:
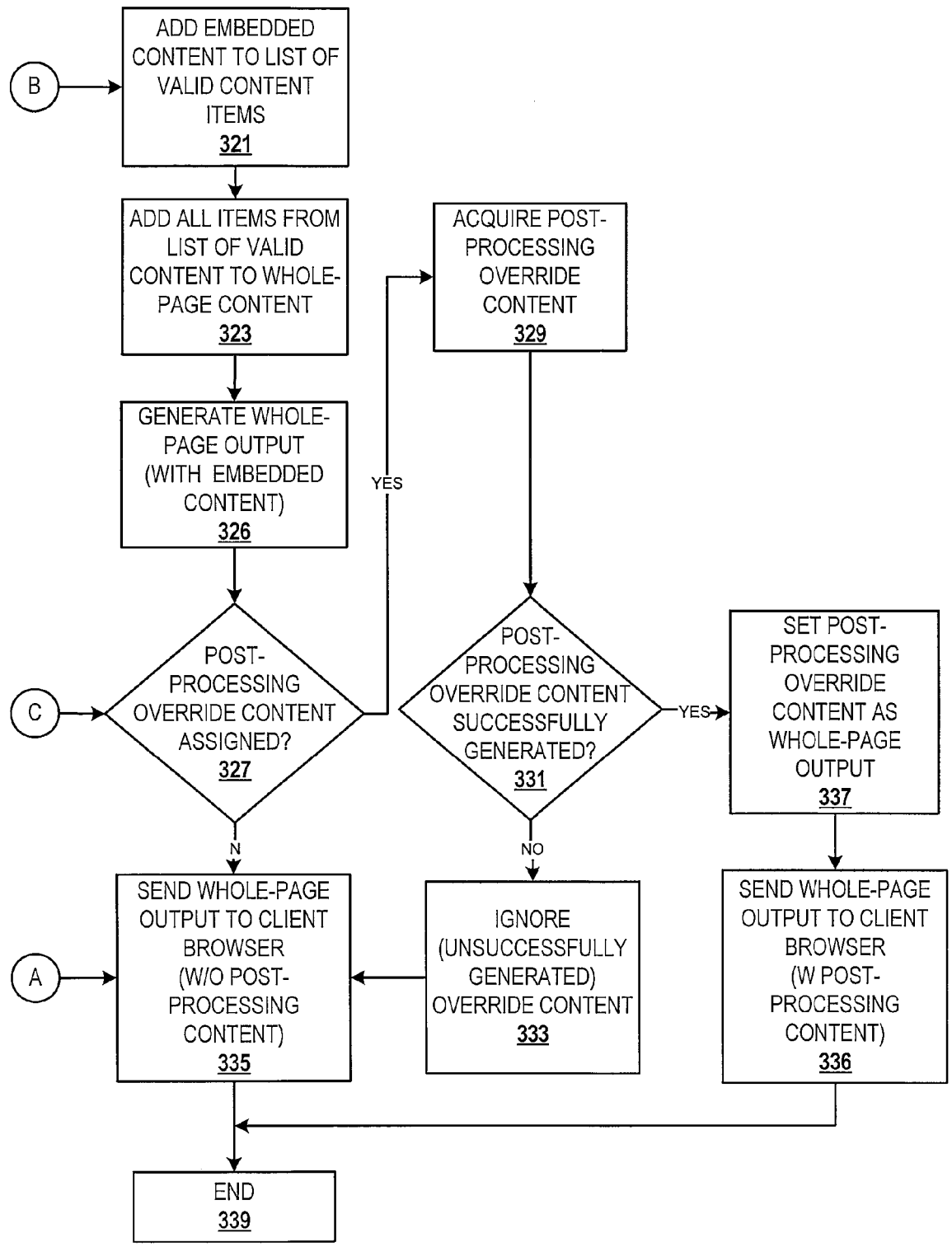

Turning now to the flow charts, FIG. 3 (illustrated as FIGS. 3A and 3B) is a flowchart illustrating the method by which the processes of the invention are implemented, according to one embodiment. Specifically, while the invention may be implemented without an explicit "new" utility controlling the processes, the processes illustrated by FIG. 3 are assumed to be completed by WPCC utility, executing on the web server (and providing the functionality of the welcome page application), in response to detection of a connection by a PCD at an access point, according to the illustrated embodiments. Although the method illustrated in FIG. 3 may be described with reference to components shown in FIGS. 1-2, it should be understood that this is merely for convenience and alternative components and/or configurations thereof can be employed when implementing the method.

The method begins with FIG. 3A at block 301, at which the user device (PCD) connected to the access point is redirected to the welcome page application functions of WPCC utility. Prior to the redirection, the utility implements a "forced first page" process to check whether there is an existing connection event with the user device (PCD) accessing the web server via the access point. As with standard operation, if the user's PCD already has an existing connection, the PCD is connected to the background network without having to interact with the welcome page. When the user's PCD does not have an existing connection (or the previously existing connection has expired), the user's PCD is redirected to the welcome page application. The WPCC utility (which provides a welcome page content profile) initially accesses a known location to load the default dynamic welcome page file (e.g., index.html or index.adp). The dynamic welcome page file is a baseline file, which renders the standard baseline welcome page when loaded into the PCD's browser. However, as provided by the described embodiments, the welcome page content profile may also assign embedded and/or override content to the welcome page, which content enhances/modifies or replaces the baseline welcome page provided by the dynamic welcome page file.

WPCC utility (by analyzing welcome page content profile) determines at block 303 whether pre-processing override content is assigned for the welcome page. If the pre-processing override content is not assigned, the utility initializes the whole-page baseline content, as shown at block 305. When the pre-processing override content is assigned, the utility acquires the pre-processing override content, at block 307. This content may be acquired directly from the CAC server 115, in one embodiment. Then, at decision block 309, the utility determines whether the pre-processing override content was successfully generated. If the pre-processing override content was not successfully generated, the process proceeds to block 305, at which the utility initializes the whole-page baseline content of the standard welcome page, as stated above.

With the whole-page baseline content initialized, a next decision is made at block 313 whether there is embedded content assigned to the current page. If there is no embedded content assigned to the current page, the WPCC utility generates the whole-page output, without any embedded content, as shown at block 325. However, if there is embedded content assigned to the current page, then the utility acquires the embedded content for inclusion in the welcome page, as shown at block 315. Then another decision is made at block 317, whether the embedded content was successfully generated. If the embedded content was not successfully generated, as determined at block 317, the embedded content is ignored and not utilized, as shown at block 319, and the standard, whole-page output is generated without embedded content.

Continuing with FIG. 3B, if as determined at block 317, the embedded content was successfully generated, the WPCC utility adds the embedded content to the list of valid content items or page output buffer (229, 259, FIG. 2) for inclusion in the welcome page, as shown at block 321. The utility also adds all items from the list of valid content to the Whole-Page content at block 323. Finally, the utility generates the whole page output at block 326, including all embedded content from the list of valid content.

Returning to block 309, when the pre-processing override content is successfully generated, the pre-processing override content is set as the pre-processing whole-page output at block 311. The process then proceeds to block 335, at which the pre-processing whole-page output is sent to the client browser for display thereon, before the process ends at termination block 339.

Following generation of the whole-page output at block 325 or 326, a decision is made at block 327 whether there is post-processing override content assigned for that page (as opposed to pre-processing assignment described above). When there is no post-processing override content assigned, the whole page output (from block 325/326) is sent to the client browser for display thereon, as shown at block 335. Then the process ends at termination block 339.

Returning to decision block 327, if there is post-processing override content assigned, then the utility acquires the post-processing override content, as shown at block 329. This post-processing content may be acquired from CAC server 115, in one embodiment. A decision is then made at block 331 whether the post-processing override content was successfully generated, and if not, the presence of the override content is ignored, at block 319. However, when the post-processing override content is successfully generated, the utility sets the post-processing override content as the whole-page output, at block 333. Then the process proceeds to block 336, at which the post-processing whole-page output is sent to the client browser, before the process ends at termination block 339.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the methods' steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

According to the described embodiments, the content included within the welcome page represents the actual HTML (hypertext markup language) source code generated by the individual content elements, which is either included within the standard baseline content (embedded) or utilized to replace the entirety of the baseline content (override). The dynamic content is automatically found and executed, with any HTML that is generated when executing the dynamic content being either included within the overall baseline page (embedded) or used to replace the standard baseline HTML page entirely (override). Thus, the dynamic content enables the overall architecture to determine, at runtime, what to display to any given PCD connected to a particular access point (or web server).

Also, according to the described embodiments, certain files (e.g., embedded, pre-processing and post-processing files) responsible for generating any pertinent dynamic content, as a result of any programmatic logic as these may apply, reside on the CAC server, and not on the local webserver. Unlike static files (e.g., ".html" files, ".txt" files, ".css" files and/or binary graphic or "rich media" files), which may be acquired from the CAC server via application of the modified 404 handler, described below, these dynamic files are not copied and cached in the local webserver's temporary directory. However, it is contemplated that these dynamic files may also be made to be cacheable on the local web server's temporary directory, in an alternate embodiment.

As described herein, the default dynamic content that provides the baseline page (e.g., "index.adp") continues to be considered the baseline page, whose content would be rendered exactly as programmed, if no embedded or override content was assigned within the welcome page profile. Within the described embodiments, content that is assigned to that baseline page via the profile, is also a dynamic file (".adp"), which is capable of making individual decisions with regards to what HTML should be rendered and displayed within the PCD's browser, whether as "embedded" or "override" content. While a static HTML may be included as either embedded or override content, in an alternate embodiment, the primary embodiments are described from the perspective of assigning dynamic content to the baseline page.

Any such dynamic file assigned as content via the welcome page profile may reside either exactly where specified on the local filesystem (e.g., /add-ins/wayport/ficcim_meeting.adp). In this case that file is sourced and executed directly by the local webserver from the webserver's own filesystem, and any HTML generated by the dynamic file would be rendered appropriately within the PCD's browser.

Alternately, if the dynamic file assigned as content to the welcome page profile does not reside where specified within the web server's filesystem, the modified 404 handler functionality (described below and within the related application) is invoked, and the utility checks the CAC server for a file of the same name, residing in the same directory hierarchy as defined by the database record in the welcome page profile (e.g., ... wayport.net/add-ins/wayport/flccim_meeting.adp). If that dynamic file does reside on the central server, and returns HTML when called by the local webserver, the returned HTML is rendered appropriately within the PCD's browser, either as "embedded" content or an "override" of baseline content.

When the baseline page is executed, any assigned content elements are simply found, wherever they might be, and these assigned content are either included, or not included, based on (1) a determination made by the content elements themselves, for dynamic content, and (2) whether the content is either cached locally (for static content), or not cached locally (for dynamic content. The following represents an example illustration in which embedded content (either static or dynamic) is sourced from one of the available sources (i.e., local filesystem, temporary directory, or CAC server) depending on characteristics of the content and/or the functional implementation features of the invention.

With this exemplary embodiment, the baseline file (e.g., index.adp) is first sourced and executed when the user is to be presented with the Welcome Page. Then, the utility finds a first item assigned as "embedded" content via the welcome page profile. The first item is indicated as being located at a specified location within the file system (e.g., /add-ins/wayport/maintenance_notice.html). The utility locates this first embedded item at that specified location, and sources and includes the output of the first item within the whole-page HTML (of the baseline page).

The utility then finds a second item that is also assigned as "embedded" content via the Welcome page profile, which second file is indicated as being located at a second addressable location (e.g., /add-ins/wayport/florida_notice.html). When the utility does not does not find the second file at the location specified within the file system, the utility checks the web server's temporary directory (e.g., /temporary_directory/add-ins/wayport/florida_notice.html). If the utility locates the file in the web server's temporary directory, the utility sources the file and includes the file's output in the whole page HTML (of the baseline page).

However, if the utility does not locate the second file within the temporary directory, the utility initiates a check for the second file with the CAC server (e.g., . . . wayport.net/add-ins/wayport/florida_notice.html). If the second file is found on the CAC server and the server version of the file is newer than the version (if any) in the web server's temporary directory, the utility copies the CAC version of the second file from the central server, places the CAC version in the web server's temporary directory. When a previous version of the file exists within the temporary directory, the utility replaces the previous version with the CAC version downloaded from the CAC server. If the second file does not exist at any of the three locations, the search for the second file terminates and the utility overlooks the file when generating the whole page HTML. Otherwise, the resulting HTML sourced from any variation of this implementation is incorporated into the whole page HTML (of the baseline page).

Following, the utility finds a third item assigned as "embedded" content, which is indicated specified as located at a specific location within the web server's filesystem (e.g., /add-ins/wayport/flccim_greeting.adp). The utility locates the third file at this location and sources and executes that file. This third file, unlike the previous two static files (.html), is a dynamic file (.adp). While executing, the dynamic file checks whether (a) the current date (perhaps by accessing the web server's calendar and time feature) is a pre-specified date during which the content should be included within the welcome page (e.g., August 21-28), and (b) the PCD is connected to a specific access point. If the executing dynamic file programmatically determines that the above two necessary criteria are met, specific HTML is returned to the calling baseline page. Otherwise, when one or both of the criteria is not met, no HTML is returned. Thus, when the executing dynamic file returns HTML, the HTML is incorporated into the whole page output of the baseline page (index.adp). Otherwise, processing of the welcome page profile continues as if this dynamic file (third item) had not been assigned.

With this ability to granularly assign content based on external criteria, such as date and time, access point location, and others, the invention enables any dynamic content element to execute any and all functionality available to any other web page or application operating within the web server environment on either the web server or the CAC server. For example, database queries may include determining whether the end user has already seen and/or interacted with a particular block of content, such as a rich media advertisement. Thus, with the features provided herein, CAC server is able to accommodate very specific content requests, such as a request to display a message under the following strict set of criteria: (1) all users connecting on a Wireless port; (2) at hotels with more than 100 rooms; (3) in Florida; (4) between 2:00 and 4:00 p.m; (5) on the first and third Tuesdays of the month; (6) on the "credit card input" page; (7) if the PCD is running Windows XP; (8) and have connected more than three times in the past six weeks; and (9) and one of those connections was in Boston.

Finally, the utility locates a fourth item that is assigned as "embedded" content, and which is indicated to be located at a next specific location within the web server's filesystem (e.g., /add-ins/wayport/flccim_registration.adp). The utility checks the specific location, and when the file is not found at that location, the utility initiates a check of the CAC server for the same file (e.g., . . . wayport.net/add-ins/wayport/flccim_registration.adp). When the file resides where specified on the CAC server, the utility invokes the file remotely (or the CAC server responds to the request by invoking the file remotely).

On the CAC server, the dynamic content file determines whether any content should be returned via one or more programmatic checks. If there is content to be returned to the requesting web server, the content is generated and returned to the requesting baseline page. Otherwise, no content is returned. If the remotely sourced content that is returned is HTML, the HTML is incorporated into the whole page output of the default baseline page (index.adp). Otherwise, if the returned content is not HTML, the utility continues (or completes) processing the welcome page profile as if the fourth item had not been assigned.

Implementation of the illustrative embodiment provides several benefits, including the following non-exhaustive list:

(1) Execution of the utility immediately delivers many benefits of a fully centralized Welcome Page application, while maintaining those of the distributed system. Content and function may be changed at any time, while network overhead remains minimized by serving binary and static content from the local web server's filesystem.

(2) By providing essentially no limit on what or where or when any arbitrary content may be presented, the utility enables an extension beyond the long-imagined "Holy Grail" of the industry, which entails custom content per-venue.

(3) Embedded content is itself capable of running application logic while generating the content's output, and the content may be nested many levels deep (e.g., as many as 250 levels), providing unprecedented granularity in determining what content to display and/or whether to display content to any given user at any time.

(4) Finally, all temporary or cached files are always and automatically kept current, allowing continual modifications of any distributed content.

Embodiments of the invention may be applied to a series of different applications, including, but not limited to the following implementations, which are presented with examples. The first implementation provides simple messaging and/or promotions and/or advertisements and/or notifications, deployable universally within the normal config-download timeframe. One example of this application is when providing advanced notice of an expected network outage during routine maintenance.

Another implementation provides customized content deployable at a particular venue for a particular event or purpose, either venue-wide or by specified criteria. FIG. 4 illustrates this feature. As shown, Welcome page 400 includes network provider content 405, connection options content with location logo 410 and customized content 415. The content is sourced form CAC server, with graphics and styles cached locally on the web server's filesystem. The content (and particularly customized content 415) is determined via page identifiers and program logic contained within the included files themselves. Thus, as an example, at Venue X (Wyndham—Buena Vista Palace) between August 29 and September 2 (pre-programmed dates), all suites numbered between 701 and 799 (specially assigned rooms with specific known access points—Access ID) receive a special "Welcome" screen 400, providing links to on-line conference registration, agenda details, etc. (customized content 415).

Yet another implementation involves system-wide overrides, deployable under any arbitrary criteria, allowing the entire connection process to be "sub-let." FIG. 5 illustrates this feature. As shown, the entire connection/welcome page process is overridden, replacing the entire welcome page with a custom, one-off Welcome screen 500, in which various different content 505 are provided arranged according to that business partner's desires. In one implementation, the complete page design/layout is provided to the network provider by the business partner/client. That page is then hooked in as an override to the Welcome Page profile. As the initial welcome page application executes, this override is automatically acquired and executed, generating a wholly customized user experience, whereby the end user may acquire a connection to the Internet by submitting login credentials to an authentication server operated by the business partner/client. In one embodiment, RADIUS is utilized to enable two-way communication between the parties. As an example, at venue X between August 29 and September 2, instead of the usual "meeting room connection" screen, users connecting in meeting rooms 1-9 receive a customized page 500 prompting them to login via login area 510 using their organization's Username/Password credentials.

Finally, as illustrated by FIG. 6, the entire Welcome Page application may be rebranded by performing a single package installation on a central server, and creating a single database record. FIG. 6 illustrates a fully re-branded Welcome Page 600, under the Omni Hotels branding, with standard connection options 605. In this implementation, all graphics and files are retrieved from the CAC server and stored locally while the page is rendered for the first user. All HypterText Markup Language (HTML) behind this page is identical to the network provider's (e.g., Wayport and McDonald's) Cascading Style Sheet layout, with only the stylesheet itself being different.

As an example of the above implementation, a business partner/client (with Brand $A) requests that Welcome pages for all venues under the business partner's/client's control be re-branded to the business partner's specification, as a requirement for utilizing the network provider's web servers. With the implementation of the WPCC utility and the FCWP master utility, such a request can be complied with relatively quickly, using only a new stylesheet and automated distribution of static content.

With the above implementations, distribution of rich media content and applications may be provided on-demand. That is, in some embodiments (e.g., with the modified 404 Handler described below and within the related application), the files are not delivered until requested by a user, at which point the files are automatically cached, and kept current. For example, games for PlayStation Portable or Nintendo, music files or videos, theatrical trailers, etc., are made available for download exclusively between Time X and Time Y, at venues of type Z. However, in other embodiments, supporting static files and/or executable source files may be distributed to local field (venue-specific) web servers ahead of time, or not at all—as in cases where the central servers will handle service and generation of all content—without nullifying the ability to customize the actual content and presentation displayed to an end user, using the mechanisms described herein.

Implementation of the illustrative embodiments enables customized web page content to be presented to a user interacting with any page that is presented to the user by any of the thousands of servers throughout a large access network. The invention provides a substantial advantage by allowing such content items as large, rich media files (e.g., video clips, music, Macromedia Flash applications, and others) to be stored on a web server to which the user is directly connected, at network transport speeds of between 10 and 100 Megabits per second. This provides an enhancement over conventional methods by which the user's browser is forced to acquire such high bandwidth content from a distant server, over the comparatively slow network link between the web server to which they are connected and the remote server where such files would be stored. Furthermore, the invention greatly reduces the amount of managerial overhead required to rapidly distribute such content on an "on-demand" basis. With conventional methods, providing this content would otherwise require updating any number of software packages installed on the aforementioned thousands of servers deployed throughout the physical network.

In another embodiment, all user interface components, and content, are moved off of the many thousands of servers altogether, and are hosted on highly scalable, centralized "server farms" instead. By specifically updating the files at the CAC server, a content provider for the web servers is able to efficiently provide updated content to the users of the numerous, dispersed web servers without having to physically load that content on each web server. The web servers which do not have updated content or a copy of the content are automatically provided the content when user logs into or accesses the network via the local web server (or access point). Of course, as mentioned above, other embodiments do provide that supporting static files and/or executable source files are distributed to local field (venue-specific) web servers ahead of time, or not at all, without nullifying the ability to customize the actual content and presentation displayed to an end user.

The above description provides exemplary embodiments for implementing the novel features of the invention. Alternate embodiments are also possible, including variations of and modifications to the above described illustrative embodiments.

A. Modified 404 Handler for Customized Content Retrieval

The illustrative embodiments of the invention address the need for availability of an extensively customizable web interface, to substantially eliminate the difficulties with content distribution across a vast network of servers. One extension of the described embodiments involves the implementation of a second-level file search and retrieval and/or the file update/replacement functionalities enabled by the invention, by which the web server is now capable of controlling retrieval and/or updates of content that is servable at the web server. Also, the web server substantially reduces the situations in which a request for servable content receives a "404" HTTP error response, even when the file is not in the web server's file system.

As described in detail in the related application, the above feature provided by that invention includes responding to a conventional "404: Not Found" error condition by implementing processes to seamlessly and automatically retrieve and display the requested content (or file), when the file is not initially located within the web server's own filesystem, or in a temporary storage directory on that filesystem, as the related application defines. These inventive features of the illustrative and described embodiments provide a method and system for actually locating, acquiring, and storing files that are intended to be served by the web server's own web pages and applications, but which do not actually exist anywhere on that server's file system when initially requested. Another feature of that invention comprises automatically updating the files stored at a web server whenever the file is requested by retrieving a more current/recent version of the file from the remote server.

As further described in the related application, previously incorporated herein by reference, one method for accomplishing this use of customized welcome pages in lieu of the stored copy of welcome page 247 is by not providing the files within the temporary storage (directory) forcing them to be retrieved in real time from the CAC server. As described in that application, when a user connects to the access point 107, the web server's search for the Welcome page and frame layout is redirected from the file system to the temporary storage. When the replacement welcome pages (pre-processing or post-processing content) is not found at the temporary storage, the web server (via WPCC utility) then sends a request to the CAC server for that content. Thus, unlike conventional server systems, which automatically defaults to the welcome page within the file system, the default location for the welcome Page, a second-level check is implemented in which the content for the welcome page (and/or page layout) are retrieved either from the temporary directory 229 or from the CAC server 115.

With the above features also incorporated herein, the above described and illustrative embodiments provide several advantages. Among these advantages are: (1) the illustrative embodiments provide many of the benefits of a fully-centralized web application, while maintaining those of the current de-centralized architecture. The invention enables content and functions to be changed at any time, while the network overhead remains minimized by serving binary and static content from the local network web server filesystem; (2) All temporary/cached files are always and automatically kept current, allowing continual modifications of any distributed content, by simply updating the files that are stored on the centralized CAC servers; (3) Managerial overhead is virtually eliminated, because these is no need to develop, qualify and deploy a large number of packages containing the files and/or the program logic necessary to display any particular content, to any number of field web servers where such content is intended to be displayed. Instead, any such files only need to be placed upon the centralized CAC server, and can then be pushed or retrieved, on demand from a user PCD in the field that accesses the access point or whose browser requests that content; and (4) There is no noticeable or measurable impact on the processing capabilities of the field web servers because the entire system is merely a modification to the same web server process that ordinarily serves pages to users connecting through the network controlled by any particular web server.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, include recordable type (tangible) media such as floppy disks, thumb drives, hard disk drives, CD ROMs, and DVDs.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

While the invention has been particularly shown and described with reference to a preferred embodiment, it will be understood by those skilled in the art that various changes in form and detail may be made therein without departing from the spirit and scope of the invention.

What is claimed is:

1. A system comprising:
    a processing device communicatively coupled to a filesystem and a temporary directory; and
    a memory storing instructions that, when executed by the processing device, cause the processing device to perform operations including:
        determining that a web page is assigned additional content based on an assignment of the additional content included in a web page content profile associated with the web page, wherein the web page is configured to display baseline content;
        searching a first location within the filesystem for the additional content, wherein the first location is identified by the web page content profile;
        searching the temporary directory based on the web page content profile for the additional content when the additional content is not found at the first location;
        requesting, based on the web page content profile, the additional content from a server when the additional content is not found within the temporary directory, wherein the additional content is requested via a network; and
        generating the web page with the additional content provided in place of, or integrated within, a section of the baseline content.

2. The system of claim 1, wherein the operations further include determining whether the additional content includes static content, and wherein generating the web page includes inserting the static content within a pre-identified section of the baseline content.

3. The system of claim 1, wherein the operations further include:
determining whether the additional content includes dynamic content;
receiving a dynamic file when the additional content includes the dynamic content; and
executing the dynamic file to generate the dynamic content for insertion within the section of the baseline content.

4. The system of claim 3, wherein the dynamic content includes embedded content, pre-processing override content, or post-processing override content, and wherein the dynamic content is generated based on a corresponding executable file by the server.

5. The system of claim 1, wherein the operations further include:
determining whether the additional content includes override content based on the web page content profile; and
retrieving a dynamic file associated with generating the override content in response to a determination that the additional content includes the override content, wherein generating the web page includes providing the override content in place of an entirety of the baseline content.

6. The system of claim 5, wherein the operations further include:
searching at least a second location within the filesystem for the dynamic file; and
requesting, via the network, the dynamic file from the server when the dynamic file is not found at the second location.

7. The system of claim 1, wherein the operations further include:
determining whether the additional content includes override content based on the web page content profile;
receiving, via the network, an output of a dynamic file executed by the server in response to a determination that the additional content includes the override content; and
storing the output of the dynamic file as the override content in the memory, wherein generating the web page includes providing the override content in place of an entirety of the baseline content.

8. The system of claim 1, wherein the operations further include:
processing a dynamic file to produce particular additional content, the particular additional content including embedded content or dynamic content; and
determining whether the particular additional content was successfully produced, wherein generating the web page includes generating the web page without the particular additional content when the particular additional content was not successfully produced.

9. The system of claim 1, wherein the web page content profile comprises a pointer that corresponds to the section of the baseline content that is to be appended to, prepended to, or replaced by the additional content.

10. The system of claim 1, wherein the operations further include generating the web page by storing a first portion of the baseline content and the additional content such that the additional content is stored in place of or integrated within, the section of the baseline content.

11. The system of claim 1, wherein the server comprises executable code that is executable to cause the server to perform operations including:
receiving, via the network, a request for the additional content;
retrieving a dynamic file associated with the additional content;
comparing a time and date parameter of the dynamic file to a current time and a current date; and
initiating execution of the dynamic file when the current date and the current time are within a time range and a date range associated with the time and date parameter.

12. The system of claim 1, wherein the server comprises executable code that is executable to cause the server to perform operations including:
receiving, via the network, a request for the additional content, wherein the request includes an identification;
determining, based on the identification, that access to the additional content is permitted; and
initiating execution of a retrieved dynamic file associated with the additional content when access to the additional content is permitted.

13. A method comprising:
determining, at a server, that a web page is assigned additional content based on an assignment of the additional content included in a web page content profile associated with the web page, wherein the web page is configured to display baseline content;
searching a first location within a filesystem for the additional content, wherein the first location is identified by the web page content profile;
searching a temporary directory based on the web page content profile for the additional content when the additional content is not found at the first location;
requesting, based on the web page content profile, the additional content from a content management system when the additional content is not found within the temporary directory, wherein the additional content is retrieved from the content management system via a network; and
generating the web page with the additional content provided in place of, or integrated within, a section of the baseline content.

14. The method of claim 13, further comprising:
determining whether the additional content includes static content, wherein generating the web page includes generating the web page with the static content inserted in place of or integrated within, the section of the baseline content.

15. The method of claim 13, further comprising:
determining whether the additional content includes un-supported content, wherein generating the web page includes generating the web page without including the un-supported content.

16. The method of claim 13, further comprising:
determining whether the additional content includes dynamic content; and
executing a dynamic file to generate the dynamic content for insertion within the section of the baseline content.

17. The method of claim 13, further comprising:
determining whether the additional content includes override content based on the web page content profile; and
retrieving a dynamic file associated with generating the override content in response to a determination that the additional content includes the override content, wherein generating the web page includes providing the override content in place of the baseline content.

18. The method of claim 13, wherein the server includes a communication mechanism, and wherein requesting the additional content from the content management system includes transmitting, via the communication mechanism to the content management system, a request associated with the additional content.

19. The method of claim 13, further comprising:
determining whether the additional content includes override content based on the web page content profile;
receiving, via the network, an output of a dynamic file executed by the content management system in response to a determination that the additional content includes the override content; and
storing the output of the dynamic file as the override content in a memory, and wherein generating the web page includes providing the override content.

20. The method of claim 13, further comprising:
processing a dynamic file to produce particular additional content that includes embedded content or dynamic content; and
determining whether the particular additional content was successfully produced, and wherein generating the web page includes generating the web page without the particular additional content when the particular additional content was not successfully produced.

21. The method of claim 13, further comprising:
storing a first portion of the baseline content in a memory; and
storing a second portion of the additional content in the memory such that the second portion of the additional content is provided in place of, or integrated within, the first portion of the baseline content.

22. A computer-readable storage device comprising instructions that are executable by a processor to perform operations comprising:
determining that a web page is assigned additional content based on an assignment of the additional content included in a web page content profile associated with the web page, wherein the web page is configured to display baseline content;
searching a first location within a filesystem for the additional content, wherein the first location is identified by the web page content profile;
searching a temporary directory based on the web page content profile for the additional content when the additional content is not found at the first location;
requesting, based on the web page content profile, the additional content from a content management system when the additional content is not found within the temporary directory, wherein the additional content is requested via a network; and
generating the web page with the additional content provided in place of, or integrated within, a section of the baseline content.

23. The computer-readable storage device of claim 22, wherein the operations further comprise:
receiving, via the network, the additional content; and
determining whether the additional content includes static content, wherein generating the web page includes inserting the static content within a pre-identified section of the baseline content.

24. The computer-readable storage device of claim 22, wherein the operations further comprise:
receiving, via the network, the additional content; and
determining whether at least a portion of the additional content includes un-supported content, and wherein generating the web page includes generating the web page without including the portion of the additional content.

25. The computer-readable storage device of claim 2, wherein the additional content includes dynamic content, wherein the dynamic content includes pre-processing override content or post-processing override content, and wherein the dynamic content is generated in response to execution of a corresponding executable file by the content management system.

26. The computer-readable storage device of claim 22, wherein the operations further comprise:
determining whether the additional content includes override content based on the web page content profile; and
retrieving a dynamic file associated with generating the override content, and wherein generating the web page includes providing the override content in place of an entirety of the baseline content.

27. The computer-readable storage device of claim 22, wherein requesting the additional content from the content management system includes transmitting, via a communication mechanism coupled to the network, a request associated with the additional content.

28. The computer-readable storage device of claim 22, wherein the operations further comprise:
determining whether the additional content includes override content based on the web page content profile;
receiving an output of a dynamic file executed by the content management system in response to a determination that the additional content includes the override content; and
storing the output of the dynamic file in a memory coupled to the processor, wherein generating the web page includes providing the override content in place of an entirety of the baseline content.

29. The computer-readable storage device of claim 22, wherein the operations further comprise:
processing a dynamic file to produce a particular additional content including embedded content or dynamic content; and
determining whether the particular additional content was successfully produced, wherein generating the web page includes generating the web page without the particular additional content when the particular additional content was not successfully produced.

30. The computer-readable storage device of claim 22, wherein the web page content profile comprises a pointer that corresponds to the section of the baseline content that is to be appended to, prepended to, or replaced by the additional content.

31. The system of claim 1, further comprising an access point operable to convey the web page to a computer system, wherein the additional content is based on a geographic location of the access point.

32. The system of claim 1, wherein particular additional content is assigned to a particular web server by the server, such that the particular web server receives the particular additional content to enable generation of a specific web page during a particular time period.

33. The system of claim 1, wherein a dynamic content element associated with the additional content performs functionality available to another web page or another application operating within a web server environment associated with the server or another web server.

34. The system of claim 1, wherein the web page content profile further includes an address, and wherein the address identifies the first location.

35. The system of claim 34, wherein searching the temporary directory based on the web page content profile comprises searching a second location within the temporary directory, wherein requesting the additional content from the server based on the web page content profile comprises requesting the additional content from a third location associated with the server, and wherein the second location and the third location are identified by the address.

36. The system of claim 1, further comprising a network device communicatively coupled to the processing device, wherein a determination whether the additional content is assigned to the web page is performed in response to receiving a first request for the web page from the network device.

37. The system of claim 36, wherein the server transmits the additional content to the processing device and to the network device in response to receiving a second request for the additional content from the processing device.

* * * * *